(12) United States Patent
Kim (10) Patent No.: US 12,552,360 B2
(45) Date of Patent: Feb. 17, 2026

(54) ELECTRIC MECHANICAL BRAKE SYSTEM AND A CALIBRATION METHOD THEREFOR

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 106 days.

(21) Appl. No.: 18/404,232

(22) Filed: Jan. 4, 2024

(65) Prior Publication Data

US 2024/0246524 A1 Jul. 25, 2024

(30) Foreign Application Priority Data

Jan. 20, 2023 (KR) .......................... 10-2023-0008878

(51) Int. Cl.
*B60T 17/22* (2006.01)
*B60T 8/171* (2006.01)
*B60T 8/172* (2006.01)
*B60T 13/74* (2006.01)

(52) U.S. Cl.
CPC ............ *B60T 17/221* (2013.01); *B60T 8/171* (2013.01); *B60T 8/172* (2013.01); *B60T 13/741* (2013.01); *B60T 17/22* (2013.01); *B60T 2270/406* (2013.01)

(58) Field of Classification Search
None
See application file for complete search history.

(56) References Cited

U.S. PATENT DOCUMENTS

| | | | |
|---|---|---|---|
| 7,143,873 B2 * | 12/2006 | Pascucci | B60T 13/741 188/72.2 |
| 8,146,715 B2 * | 4/2012 | Baier-Welt | F16D 66/00 188/73.1 |
| 8,177,308 B2 * | 5/2012 | Ralea | B60T 13/741 188/71.8 |

(Continued)

FOREIGN PATENT DOCUMENTS

| | | | | |
|---|---|---|---|---|
| CA | 2588520 A1 | * | 8/2006 | ............. B60T 13/74 |
| CA | 2588520 C | * | 10/2013 | ............. B60T 13/74 |

(Continued)

*Primary Examiner* — Kevin R Steckbauer
(74) *Attorney, Agent, or Firm* — NovoTechIP International PLLC (57) ABSTRACT

A method of calibration includes determining whether thermal expansion has been detected the electric mechanical brakes when a braking force is generated; performing a first calibration to calibrate each electric mechanical brake in which thermal expansion has been detected while the vehicle is running; performing a second calibration to calibrate each electric mechanical brake that has been calibrated in the first calibration after the vehicle is stopped; and determining whether thermal expansion has been detected in the electric mechanical brakes and calibrating the air gaps of the electric mechanical brakes in a preset order after the vehicle is stopped, when it is not determined that thermal expansion has been detected in any one of the electric mechanical brakes while a braking force is being generated in the running vehicle.

9 Claims, 4 Drawing Sheets

(56) References Cited

U.S. PATENT DOCUMENTS

| | | | |
|---|---|---|---|
| 8,430,213 B2 * | 4/2013 | Yokoyama | F16D 65/18 188/71.7 |
| 8,627,929 B2 * | 1/2014 | Baumgartner | F16D 65/0978 188/1.11 E |
| 9,457,786 B2 * | 10/2016 | Baumgartner | G01L 5/28 |
| 9,989,116 B2 * | 6/2018 | Narula | F16D 55/22 |
| 10,391,985 B2 * | 8/2019 | Misumi | B60T 8/17 |
| 11,623,620 B2 * | 4/2023 | Putz | B60T 8/17 188/71.8 |
| 2005/0167212 A1 * | 8/2005 | Pascucci | B60T 13/741 188/72.2 |
| 2008/0283346 A1 * | 11/2008 | Ralea | B60T 13/741 188/156 |
| 2009/0133971 A1 * | 5/2009 | Baier-Welt | F16D 66/00 188/1.11 E |
| 2009/0218179 A1 * | 9/2009 | Yokoyama | F16D 65/18 188/1.11 L |
| 2018/0148022 A1 * | 5/2018 | Misumi | B60T 17/221 |
| 2021/0078557 A1 * | 3/2021 | Kobune | B60T 13/741 |
| 2021/0269001 A1 * | 9/2021 | Suzuki | B60T 8/329 |
| 2022/0355771 A1 * | 11/2022 | Fujita | B60T 17/22 |
| 2023/0044940 A1 * | 2/2023 | Kim | B60T 17/22 |
| 2024/0246524 A1 * | 7/2024 | Kim | B60T 17/22 |

FOREIGN PATENT DOCUMENTS

| | | | | |
|---|---|---|---|---|
| CN | 101365893 A | * | 2/2009 | F16D 65/18 |
| CN | 103362997 A | * | 10/2013 | F16D 66/026 |
| CN | 103987596 A | * | 8/2014 | H02P 6/34 |
| CN | 111169454 A | * | 5/2020 | B60T 17/22 |
| CN | 111169454 B | * | 7/2021 | F16D 65/38 |
| DE | 102022202615 A1 | * | 5/2023 | B60T 17/22 |
| DE | 102022202615 B4 | * | 2/2024 | F16D 51/22 |
| EP | 1985884 A1 | * | 10/2008 | B60T 13/741 |
| EP | 1985884 B1 | * | 10/2012 | F16D 65/18 |
| FR | 2850925 A1 | * | 8/2004 | B60T 7/107 |
| JP | 2004175203 A | * | 6/2004 | B60T 13/66 |
| JP | WO2007091337 A1 | * | 7/2009 | F16D 65/18 |
| JP | 7241072 B2 | * | 3/2023 | B60T 13/662 |
| KR | 20240116221 A | * | 7/2024 | B60T 8/172 |
| WO | WO-2004071832 A2 | * | 8/2004 | B60T 7/107 |
| WO | WO-2018181784 A1 | * | 10/2018 | F16D 65/56 |
| WO | WO-2023072351 A1 | * | 5/2023 | F16D 55/08 |

* cited by examiner

ELECTRIC MECHANICAL BRAKE SYSTEM AND A CALIBRATION METHOD THEREFOR

CROSS-REFERENCE TO RELATED APPLICATIONS

The present application claims the benefit under 35 USC § 119(a) of Patent Application No. 10-2023-0008878, filed on Jan. 20, 2023, in Korea, the entire disclosure of which is incorporated herein by reference for all purposes.

TECHNICAL FIELD

The present disclosure relates to an electric mechanical brake system and calibration method therefor.

BACKGROUND

An electric mechanical brake system is based on a mechanism such as a driving actuator equipped with a motor in a caliper, a gear, and a screw. Because the electric mechanical brake system is capable of active braking and independent braking by wheel, it can perform additional functions such as an anti-lock braking system (ABS), an electric stability control (ESC), a traction control system (TCS), and an autonomous emergency braking (AEB) as well as general braking of a vehicle. In addition, because the electric mechanical brake system has less delay in delivering hydraulic pressure compared to conventional hydraulic braking devices, higher braking performance can be produced.

The electric mechanical brake system determines the degree of wear of brake pads and controls an air gap based on the degree of wear. In addition, thermal expansion occurs in brake pads due to frictional heat generated when a vehicle brakes. The electric mechanical brake system determines whether thermal expansion has been detected in any one of electric mechanical brakes and calibrates an electric mechanical brake in which thermal expansion has been detected. When an engine of a vehicle is not turned on, that is, when a brake system is initialized, the calibration process may be performed on each electric mechanical brake.

When a vehicle is running or stopped, the calibration process is performed on each electric mechanical brake. The electric mechanical brake system obtains information about an air gap, a value of consumption current, etc. by using a driving motor that pressurizes and depressurizes a piston in a driving master cylinder.

The electric mechanical brake system may require a process of confirming a braking force of a certain amount or more in order to initialize or calibrate an air gap. However, an electric mechanical brake system that performs sensorless control needs to receive a braking command equal to a braking force required for calibration when calibrating an air gap of an electric mechanical brake. Furthermore, the speed at which the calibration is made is based on a driver's command by a brake pedal, the calibration can be carried out only during a brake release process where the calibration can be made relatively freely. Therefore, there is a problem in that the electric mechanical brake performing the sensorless control has less freedom of calibration.

In addition, when a vehicle is stopped and kept stopped, a braking force of an electric mechanical brake can be freely generated, but there is a problem in that noise is generated during the calibration process because the time for performing the calibration is short.

SUMMARY

According to an embodiment of the present disclosure, it may be possible for the electric mechanical brake system to precisely control a braking force by calibrating electric mechanical brakes when a vehicle is running or stopped.

According to an embodiment of the present disclosure, it may be possible for the electric mechanical brake system to increase the emotional quality of a vehicle by reducing noise generated when performing the calibration process.

The problems to be solved by the present disclosure are not limited to the above-mentioned problems, and the following description will allow a person having ordinary skill in the art to clearly understand other problems not mentioned above.

According to an embodiment of the present disclosure, it may be possible for the electric mechanical brake system to precisely control a braking force by calibrating electric mechanical brakes when a vehicle is running or stopped.

According to an embodiment of the present disclosure, it may be possible for the electric mechanical brake system to increase the emotional quality of a vehicle by reducing noise generated when performing the calibration process.

DETAILED DESCRIPTION

Hereinafter, some exemplary embodiments of the present disclosure will be described in detail with reference to the accompanying drawings. In the following description, like reference numerals preferably designate like elements, although the elements are shown in different drawings. Furthermore, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary.

In describing components in the embodiments according to the present disclosure, referring to a front, rear, etc. direction is only to indicate the position and direction in which a certain component is combined with other components, and the nature, order, etc. of the component is not limited by the direction. In describing components in the embodiments according to the present disclosure, when something is described as being at the front or in a front direction, it means that it is located above a certain component, for example, on an "upper part," "upper end," and the like, and, when something is described as being at the rear or in a rear direction, it means that it is located below a certain component, for example, on a "lower part," "lower end," and the like.

Figure 1:
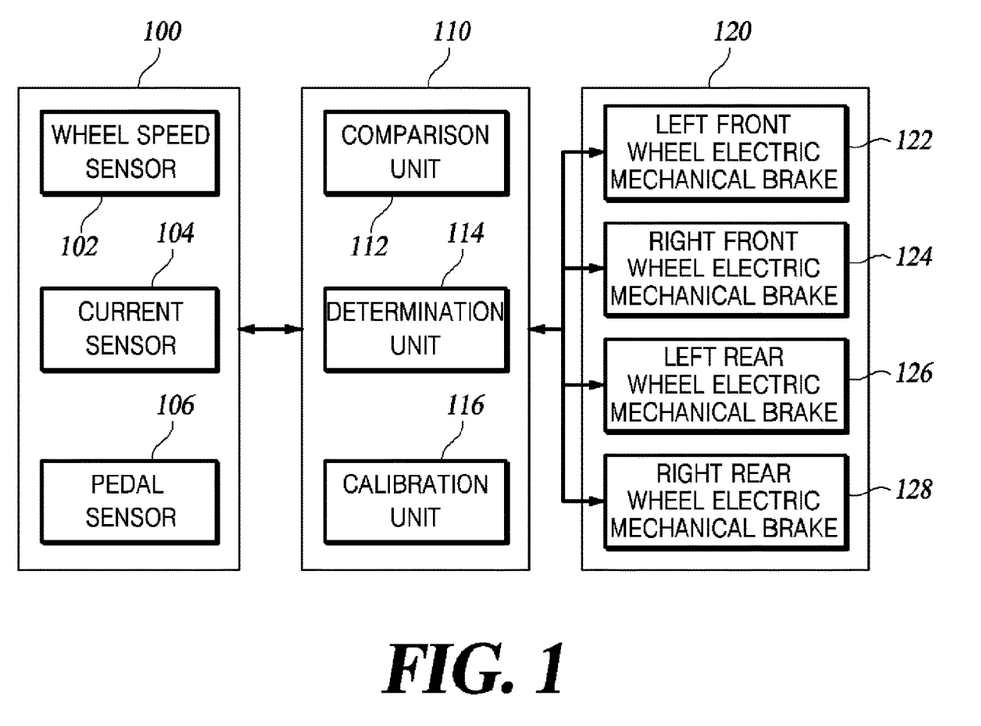
FIG. 1 is a view of components of an electric mechanical brake system according to an embodiment of the present disclosure.

FIG. 1 is a view of components of an electric mechanical brake system according to an embodiment of the present disclosure. Referring to FIG. 1, an electric mechanical brake system may include all or some of a sensor unit 100, a control unit 110, and a driving unit 120. The sensor unit 100 may include all or some of a wheel speed sensor 102, a current sensor 104, and a pedal sensor 106. The wheel speed sensor 102 may measure the speed of each wheel (FR, FL, RR, and RL) of a vehicle. The wheel speed sensor 102 may be placed in the vicinity of each wheel (FR, FL, RR and RL). The control unit 110 may estimate the speed of a vehicle based on the speed of each wheel measured by the wheel speed sensor 102.

The current sensor 104 may measure consumption current generated when a driving motor (not shown) of an electric mechanical brake is pressurized and depressurized. While a vehicle is running, the control unit 110 may determine whether thermal expansion has occurred in an electric mechanical brake based on the consumption current measured by the current sensor 104. Here, whether the thermal expansion has occurred may be determined by determining whether an airgap indicating a distance between a pad and a disk in an electric mechanical brake has been reduced.

The pedal sensor 106 may measure the pressure applied to a pedal brake. The pedal sensor 106 may measure pedal pressure formed based on a driver's intention to brake, that is, a command by a brake pedal. The sensor unit 100 may further include a pedal stroke sensor. The pedal stroke sensor may sense a driver's intention to brake by measuring a pedal stroke when the pedal sensor 106 does not normally operate.

The control unit 110 may include a comparison unit 112, a determination unit 114, and a calibration unit 116. The comparison unit 112 may compare a value sensed by the sensor unit 100 with a reference value. For example, the comparison unit 112 may compare the value of consumption current of a braking motor based on pedal pressure measured by the pedal sensor 106 and the pedal stroke sensor (not shown) with a preset value of consumption current. The value of consumption current of the motor may increase in proportion to a braking force. When the value of consumption current of the motor is greater than the preset value of consumption current, thermal expansion in an electric mechanical brake may be detected.

The determination unit 114 may determine whether to calibrate air gaps of electric mechanical brakes disposed on wheels (FR, RL, RR, and RL) of a vehicle based on the result of comparison by the comparison unit 112.

The calibration unit 116 may calibrate an air gap of an electric mechanical brake based on the result of determination by the determination unit 114. The calibration unit 116 may calibrate an air gap of an electric mechanical brake by calculating a calibration value depending on the driving condition of a vehicle. For example, while a vehicle is running, when calibrating any one of electric mechanical brakes based on the result of determination by the determination unit 114, the calibration unit 116 may calibrate the electric mechanical brake by a distance shorter than a travel distance of an air gap of the electric mechanical brake.

The driving unit 120 may include a left front wheel electric mechanical brake (FL electric mechanical brake) 122, a right front wheel electric mechanical brake (FR electric mechanical brake) 124, a left rear wheel electric mechanical brake (RL electric mechanical brake) 126, and a right rear wheel electric mechanical brake (RR electric mechanical brake) 128.

The left front wheel electric mechanical brake 122 may be disposed on a left front wheel (FL) of a vehicle to generate a braking force. The right front wheel electric mechanical brake 124 may be disposed on a right front wheel (FR) of the vehicle to generate a braking force. The left front wheel electric mechanical brake 122 and the right front wheel electric mechanical brake 124 may be disposed at both ends of an axle.

The left rear wheel electric mechanical brake 126 may be disposed on a left rear wheel (RL) of a vehicle to generate a braking force. The right rear wheel electric mechanical brake 128 may be disposed on a right rear wheel (RR) of the vehicle to generate a braking force. The left rear wheel electric mechanical brake 126 and the right rear wheel electric mechanical brake 128 may be disposed at both ends of an axle.

The driving unit 120 may receive a calibration value from the control unit 110 and perform a calibration process based on the received calibration value.

Figure 2:
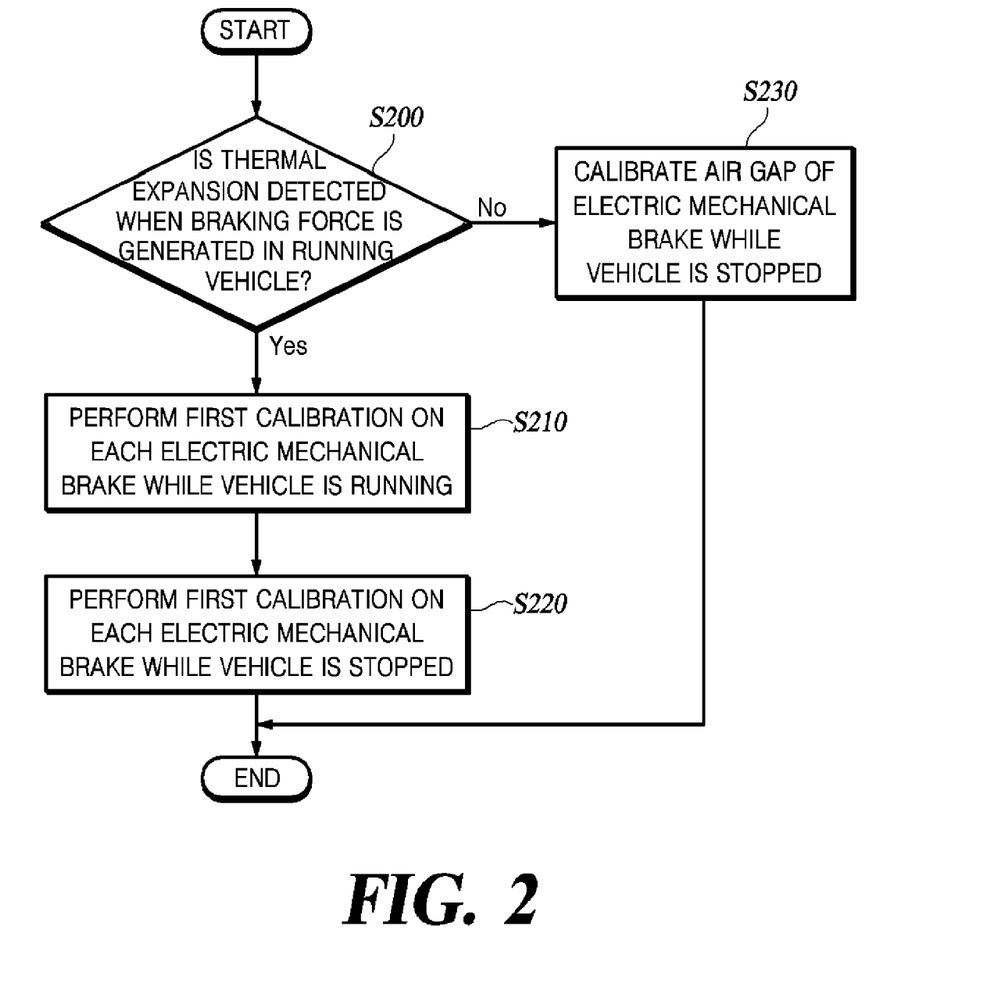
FIG. 2 is a flowchart illustrating a method of control by the electric mechanical brake system according to an embodiment of the present disclosure.

FIG. 2 is a flowchart illustrating a method of control by the electric mechanical brake system according to an embodiment of the present disclosure.

Referring to FIG. 2, when a braking force is generated in a driving vehicle, it is determined whether thermal expansion is detected at S200. The control unit 110 may receive the values of consumption current of the front wheel electric mechanical brakes 122 and 124 and the rear wheel electric mechanical brakes 126 and 128 from the current sensor 104 and may determine whether the received values of consumption current are greater than a preset value of consumption current. When determining that the value of consumption current of an electric mechanical brake is greater than a preset value of consumption current, the control unit 110 may determine that thermal expansion has occurred.

At S200, when it is determined that thermal expansion has occurred in electric mechanical brakes, a first calibration may be made for each electric mechanical brake while the vehicle is running at S210. The calibration unit 116 may calibrate air gaps of the left rear wheel electric mechanical brake 122, the right front wheel electric mechanical brake 124, the left rear wheel electric mechanical brake 126, and the right rear wheel electric mechanical brake 128. The calibration unit 116 may calibrate the electric mechanical brakes 122, 124, 126, and 128 in a preset order.

During the first calibration, the determination unit 114 may determine whether thermal expansion has occurred in the electric mechanical brakes 122, 124, 126, and 128, and the calibration unit 116 may calibrate an air gap of at least one of the electric mechanical brakes 122, 124, 126, and 128 where thermal expansion has occurred, based on the result of determination by the determination unit 114. Here, due to the speed of the vehicle, the control unit 110 may calibrate the air gaps of the electric mechanical brakes 122, 124, 126, and 128 for a part of the maximum travel distance thereof.

However, when a vehicle is running, it may be impossible to generate a braking force that is not based on a braking command in order to calibrate the electric mechanical brakes 122, 124, 126, and 128. In addition, because a braking command equal to the braking force required for the calibration must be received and the speed at which the calibration is made is based on a driver's command by a brake pedal, the calibration can be made only during a brake release process where the calibration can be made relatively freely. Accordingly, while a vehicle is running, the control unit 110 may calibrate the air gaps of the electric mechanical brakes 122, 124, 126, and 128 for a part of the total travel distance thereof.

Specifically, the control unit 110 may pressurize a piston to calibrate air gaps of the electric mechanical brakes 122, 124, 126, and 128. Here, since the vehicle is running, the control unit 110 may calibrate the air gap of the electric mechanical brake by pressurizing the piston for a part of the total stroke distance of the piston.

After a vehicle stops, a second calibration may be performed for each electric mechanical brake at S220. The control unit 110 may determine whether the vehicle has stopped based on the speed of each wheel measured by the wheel speed sensor 102. When it is determined that the vehicle has stopped, the control unit 110 may first perform the second calibration on the electric mechanical brake 122, 124, 126, and 128 on which the first calibration has been performed at S210. The control unit 110 may first perform the second calibration on the electric mechanical brake on which the first calibration has been performed at S210. For example, when the left front wheel electric mechanical brake 122, the right front wheel electric mechanical brake 124, the left rear wheel electric mechanical brake 126, and the right rear wheel electric mechanical brake 128 must be sequentially calibrated in a predetermined order, the calibration must be performed in the order. However, when it is determined that thermal expansion has occurred in the left rear wheel electric mechanical brake 126 and the right rear wheel electric mechanical brake 128 while the vehicle is running, one or both of the left rear wheel electric mechanical brake 126 and the right rear wheel electric mechanical brake 128 may be calibrated without calibrating the left front wheel electric mechanical brake 122 after the vehicle has stopped.

Accordingly, the control unit 110 may calibrate an air gap of an electric mechanical brake depending on the driving condition of the vehicle based on S210 and S220, that is, the process of the first calibration and the process of the second calibration. For example, when consumption current having a value greater than a current value that an electric mechanical brake of a driving vehicle is expected to have detected, the control unit 110 may perform the first calibration on the electric mechanical brake in which the consumption current having a greater value is detected. In addition, when the vehicle stops, the control unit 110 may perform the second calibration on the electric mechanical brake on which the first calibration has been performed. The second calibration may be performed on the electric mechanical brake for which the first calibration has been performed to make the calibration for the total stroke distance of a piston. That is, when the vehicle stops, a precision control to make the calibration for the total stroke distance of the piston may be performed to calibrate the air gaps of the electric mechanical brakes 122, 124, 126, and 128.

When the control unit 110 determines that an air gap of an electric mechanical brake has become larger, it may be unnecessary to immediately perform the calibration process, which is because wear of a friction material has caused the expansion of the air gap. However, when the control unit 110 determines that the air gap of the electric mechanical brake has been reduced, the air gap of the electric mechanical brake must be immediately calibrated, which is because the air gap has been reduced due to factors such as thermal expansion.

Figure 3:
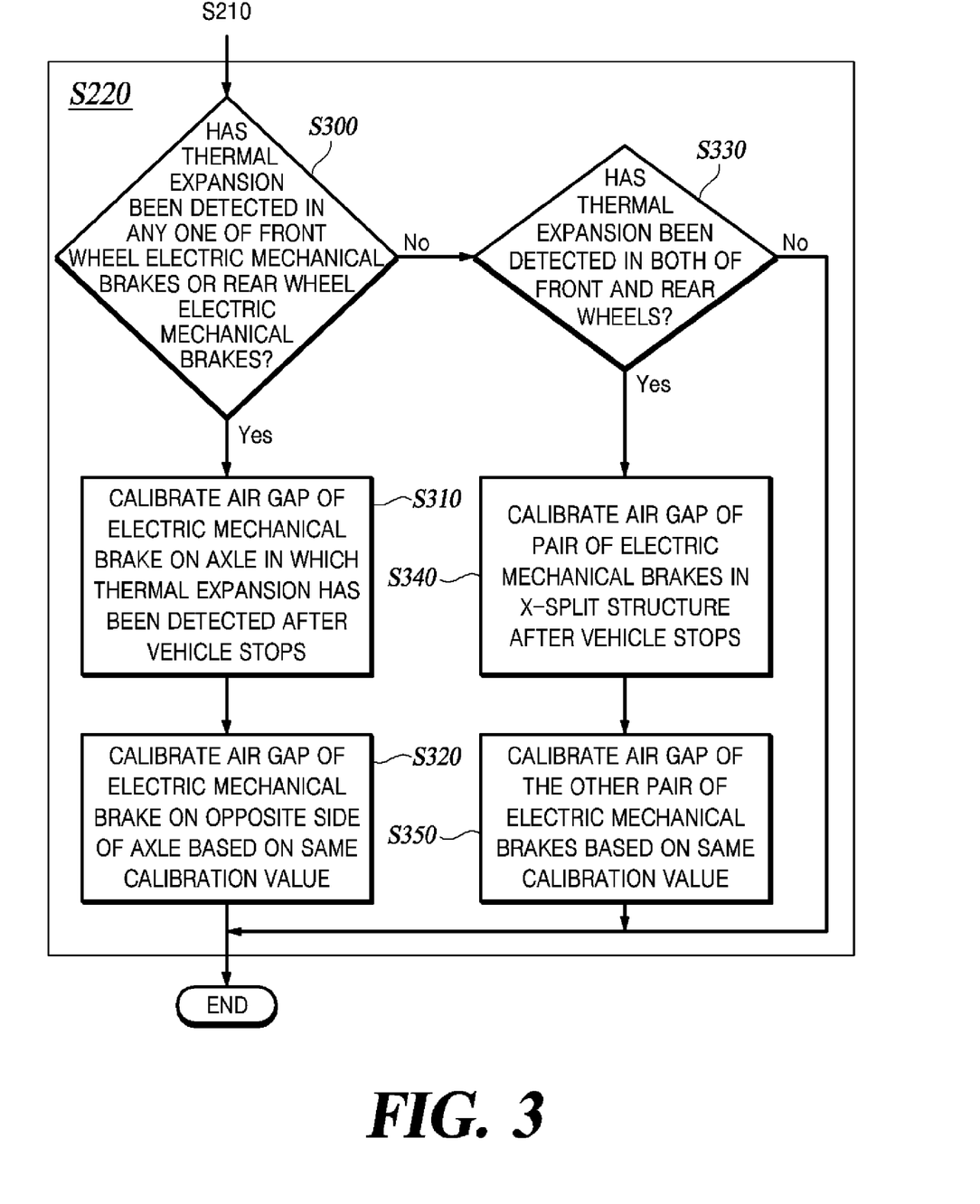
FIG. 3 is a flowchart illustrating the process of S220 in FIG. 2 in detail.

FIG. 3 is a flowchart illustrating the process of S220 in FIG. 2 in detail.

Referring to FIG. 3, it is determined whether thermal expansion has been detected in any one of the front wheel electric mechanical brakes 122 and 124 or the rear wheel electric mechanical brakes 126 and 128 at S300. The front wheel electric mechanical brakes 122 and 124 may include the left front wheel electric mechanical brake 122 and the right front wheel electric mechanical brake 124. The rear wheel electric mechanical brakes 126 and 128 may include the left rear wheel electric mechanical brake 126 and the right rear wheel electric mechanical brake 128. Using the current sensor 104, the control unit 110 may determine whether thermal expansion has occurred in the left front wheel electric mechanical brake 122, the right front wheel electric mechanical brake 124, the left rear wheel electric mechanical brake 126, and the right rear wheel electric mechanical brake 128.

At S300, when it is determined that thermal expansion has been detected in any one of the front wheel electric mechanical brakes 122 and 124 or the rear wheel electric mechanical brakes 126 and 128, the air gap of the electric mechanical brake in which the thermal expansion has been detected may be calibrated after the vehicle stops at S310. When it is determined that thermal expansion has been detected in any one of the front wheel electric mechanical brakes 122 and 124 or the rear wheel electric mechanical brakes 126 and 128, the control unit 110 may first calibrate the electric mechanical brake in which the thermal expansion has been detected. For example, when it is determined that thermal expansion has been detected in the left front wheel electric mechanical brake 122, the control unit 110 may first calibrate the air gap of the left front wheel electric mechanical brake 122.

The air gap of the electric mechanical brake on the opposite side of the axle may be calibrated based on the same calibration value at S320. The control unit 110 may calibrate an air gap of any one of the front wheel electric mechanical brakes 122 and 124 or the rear wheel electric mechanical brakes 126 and 128 and may calibrate an air gap of an electric mechanical brake on the opposite side of the same axle, that is, an electric mechanical brake connected to the same axle as the calibrated electric mechanical brake. For example, at S310, when the air gap of the left rear wheel electric mechanical brake 126 has been calibrated, the control unit 110 may calibrate the air gap of the right rear wheel electric mechanical brake 128 connected to the same axle as the left rear wheel electric mechanical brake 126. Here, the control unit 110 may calibrate the air gap of the right rear wheel electric mechanical brake 128 based on the calibration value applied when calibrating the air gap of the left rear wheel electric mechanical brake 126.

At S300, when it is not determined that thermal expansion has been detected in any one of the front wheel electric mechanical brakes 122 and 124 or the rear wheel electric mechanical brakes 126 and 128, it may be determined whether thermal expansion has been detected in both of the front wheel electric mechanical brakes 122 and 124 and the rear wheel electric mechanical brakes 126 and 128 at S330. When it is not determined that thermal expansion has been detected in any one of the front wheel electric mechanical brakes 122 and 124 or the rear wheel electric mechanical brakes 126 and 128, the control unit 110 may determine whether thermal expansion has been detected in both of the front wheel electric mechanical brakes 122 and 124 and the rear wheel electric mechanical brakes 126 and 128.

When it is determined that thermal expansion has been detected in both of the front wheel electric mechanical brakes 122 and 124 and the rear wheel electric mechanical brakes 126 and 128 at S330, after the vehicle is stopped, air gaps of a pair of electric mechanical brakes among the front wheel electric mechanical brakes 122 and 124 and the rear wheel electric mechanical brakes 126 and 128 in the X-split structure may be calibrated at S340. For example, the control unit 110 may simultaneously calibrate the air gaps of the left front wheel electric mechanical brake 122 and the right rear wheel electric mechanical brake 128. Here, the left front wheel electric mechanical brake 122 and the right rear wheel electric mechanical brake 128 may be disposed on different axles and on the diagonal.

Therefore, the control unit 110 may simultaneously calibrate a pair of electric mechanical brakes disposed on different axles and on the diagonal among the front wheel electric mechanical brakes 122 and 124 and the rear wheel electric mechanical brakes 126 and 128 in the X-split structure. When the control unit 110 calibrates two electric mechanical brakes at the same time, noise may increase, but it may be possible to calculate a precise calibration value by precisely determining whether thermal expansion has been detected in electric mechanical brakes. In addition, when a pair of electric mechanical brakes are calibrated, the braking force of the electric mechanical brakes in the calibration process may decrease. Accordingly, the control unit 110 may increase the braking force of the two remaining electric mechanical brakes that are not being calibrated.

The air gaps of the two remaining electric mechanical brakes may be calibrated based on the same calibration value at S350. The control unit 110 may calibrate a pair of electric mechanical brakes at S340, and may calibrate the air gaps of the two remaining electric mechanical brakes based on the same calibration value. For example, when the air gaps of the left front wheel electric mechanical brake 122 and the right rear wheel electric mechanical brake 128 have been calibrated at S340, the control unit 110 may calibrate the air gaps of the right front wheel electric mechanical brake 124 and the left rear wheel electric mechanical brake 126. The control unit 110 may calibrate the air gap of the right front wheel electric mechanical brake 124 based on the calibration value of the left front wheel electric mechanical brake 122. The control unit 110 may calibrate the air gap of the left rear wheel electric mechanical brake 126 based on the calibration value of the right rear wheel electric mechanical brake 128. That is, the control unit 110 may update a calibration value when calibrating air gaps of two electric mechanical brakes disposed on the diagonal. The control unit 110 may calibrate the air gaps of the remaining electric mechanical brakes based on the same calibration value by transmitting an updated calibration value to the remaining electric mechanical brakes that have not been calibrated.

Figure 4:
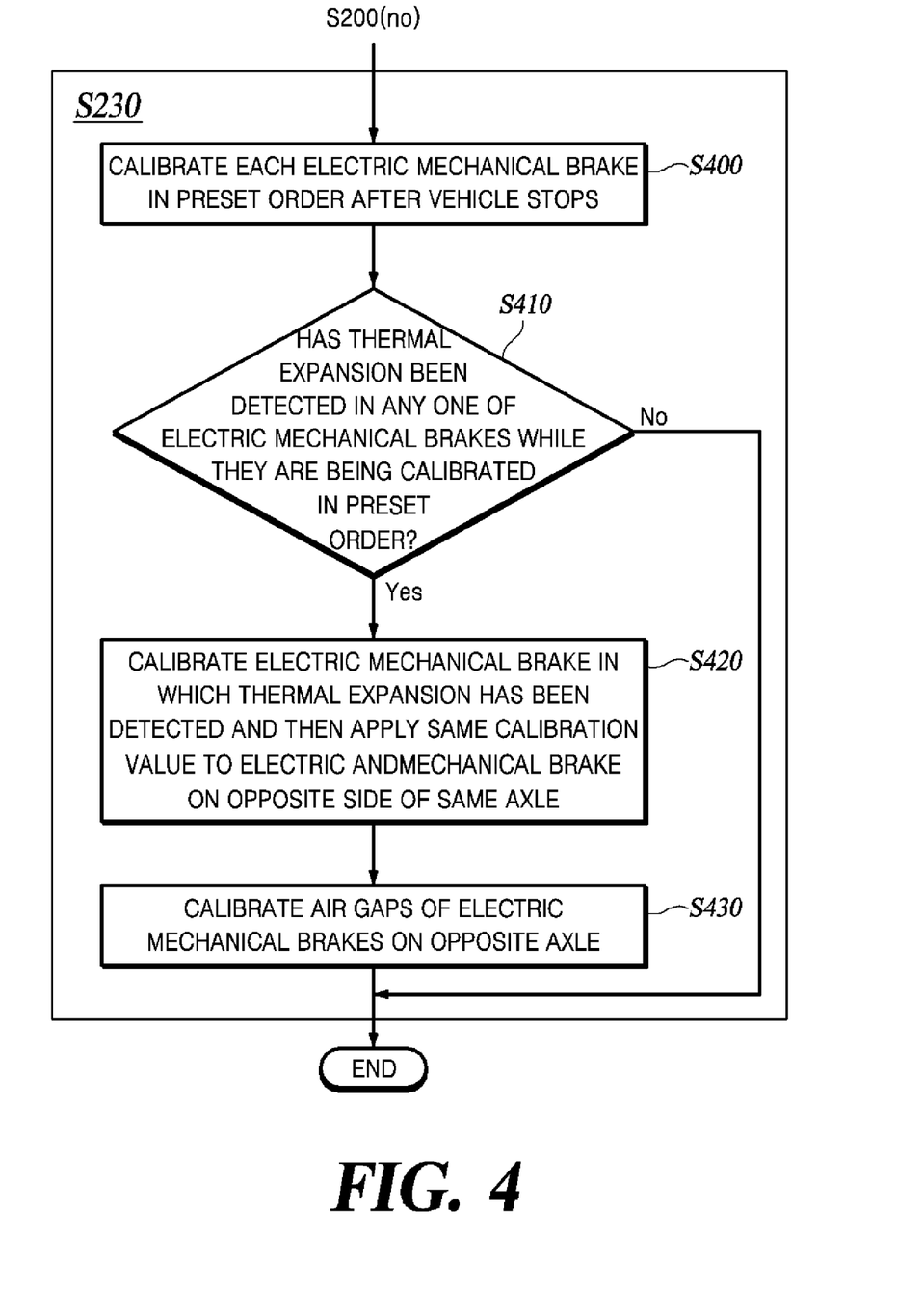
FIG. 4 is a flowchart showing the process of S230 in FIG. 2 in detail.

FIG. 4 is a flowchart showing the process of S230 in FIG. 2 in detail.

Referring to FIG. 4, after a vehicle is stopped, each electric mechanical brake may be calibrated in a preset order at S400. The control unit 110 may calibrate the electric mechanical brakes 122, 124, 126, and 128 in a preset order.

It may be determined whether thermal expansion has been detected in any one of the electric mechanical brakes 122, 124, 126, and 128 while they are being calibrated in a preset order at S410. When it is determined that thermal expansion has been detected in any one of the electric mechanical brakes 122, 124, 126, and 128 while they are being calibrated in a preset order at S410, after an air gap of an electric mechanical brake in which thermal expansion has been detected is calibrated, an air gap of an electric mechanical brake on the opposite side of the axle of the electric mechanical brake that has been calibrated may also be calibrated based on the same calibration value at S420.

An air gap of an electric mechanical brake disposed on the opposite axle may be calibrated at S430. The control unit 110 may calibrate the air gaps of the other two electric mechanical brakes disposed on the other axle opposite to the axle of the two electric mechanical brakes that have been calibrated at S420. For example, when it is determined that thermal expansion has been detected in the left front wheel electric mechanical brake 122 at S410, the control unit 110 may calibrate the air gap of the left front wheel electric mechanical brake 122 and then calibrate the air gap of the right front wheel electric mechanical brake 124 by applying the same calibration value. The control unit 110 may calibrate the air gaps of the front wheel electric mechanical brakes 122 and 124 and then calibrate the air gaps of the rear wheel electric mechanical brakes 126 and 128. Here, the calibration value applied to the rear wheel electric mechanical brakes 126 and 128 may be different from the calibration value applied to the front wheel electric mechanical brakes 122 and 124. This is because thermal expansion may not occur in the rear wheel electric mechanical brakes 126 and 128 even when thermal expansion has been detected in the left front wheel electric mechanical brake 122.

According to an embodiment of the present disclosure, it may be possible for the electric mechanical brake system to precisely control a braking force by calibrating the electric mechanical brakes 122, 124, 126, and 128 when a vehicle is running or stopped.

According to an embodiment of the present disclosure, it may be possible for the electric mechanical brake system to increase the emotional quality of a vehicle by reducing noise generated when performing the calibration process.

The various embodiments of the systems and techniques described herein may be implemented as digital electronic circuits, integrated circuits, field programmable gate arrays (FPGAs), application specific integrated circuits (ASICs), computer hardware, firmware, software, and/or combinations thereof. Such various embodiments may be implemented as one or more computer programs executable on a programmable system. The programmable system may include at least one programmable processor (which may be a special purpose processor or a general-purpose processor) coupled to receive data and instructions from and transmit data and instructions to a storage system, at least one input device, and at least one output device. Computer programs (also known as programs, software, software applications, or codes) may contain instructions for a programmable processor, and may be stored in a "computer-readable recording medium."

Examples of the computer-readable recording medium may include all types of recording devices in which data that can be read by a computer system is stored. Such computer-readable recording media may be non-volatile or non-transitory media such as ROM, CD-ROM, magnetic tape, floppy disk, memory card, hard disk, magneto-optical disk, and storage device, and may also be a transitory medium such as a data transmission medium. In addition, the computer-readable recording media may be distributed in computer systems connected through a network, and computer-readable codes may be stored and executed in a distributed manner.

In the flowcharts in the present specification, it is described that each process sequentially occurs, but this is merely an example of the technology of an embodiment of the present disclosure. In other words, a person having ordinary skills in the art to which an embodiment of the present disclosure pertains may make various modifications and variations by changing the orders described in the flowcharts in the present specification or by undergoing one or more of the processes in parallel within the essential characteristics of an embodiment of the present disclosure, so the flowcharts in this specification are not limited to a time-series order.

What is claimed is:

1. A method of calibration of electric mechanical brakes of an electric mechanical brake apparatus of a vehicle, comprising:
    determining whether thermal expansion has been detected in any of the electric mechanical brakes when a braking force is generated;
    performing a first calibration to calibrate each electric mechanical brake in which thermal expansion has been detected, the first calibration being performed while the vehicle is running;
    performing a second calibration to calibrate each electric mechanical brake that has been calibrated in the first calibration after the vehicle is stopped; and
    calibrating the air gaps of the electric mechanical brakes in a preset order after the vehicle is stopped, when it is determined that thermal expansion has not been detected in any one of the electric mechanical brakes while the braking force is being generated in the vehicle.

2. The method of claim 1, wherein the first calibration includes calibrating some of air gaps of at least one of the electric mechanical brakes in which thermal expansion has been detected.

3. The method of claim 1, wherein the second calibration includes:
    determining whether thermal expansion has been detected in any electric mechanical brake of the electric mechanical brake apparatus, the electric mechanical brake apparatus including front wheel electric mechanical brakes and rear wheel electric mechanical brakes;
    calibrating an air gap of a first electric mechanical brake in which thermal expansion has been detected after the vehicle is stopped; and
    calibrating an air gap of a second electric mechanical brake that is on an opposite side of the axle from the first electric mechanical brake based on a same calibration value as used for the first electric mechanical brake after calibrating the first electric mechanical brake.

4. The method of claim 3, wherein the second calibration involves:
    determining whether thermal expansion has been detected in both the front wheel electric mechanical brakes and the rear wheel electric mechanical brakes;
    calibrating air gaps of a first pair of electric mechanical brakes from the front wheel electric mechanical brakes or rear wheel electric mechanical brakes in an X-split structure when thermal expansion has been detected in both of the front wheel electric mechanical brakes and the rear wheel electric mechanical brakes; and
    calibrating, based on the same calibration value, air gaps of a second pair of electric mechanical brakes from the front wheel electric mechanical brakes and the rear wheel electric mechanical brakes in the X-split structure after calibrating the air gaps of the first pair of electric mechanical brakes.

5. The method of claim 1, wherein the process of calibrating the electric mechanical brakes in the preset order includes:
    calibrating each electric mechanical brake in the preset order after the vehicle is stopped;
    determining whether thermal expansion has been detected in any one of the electric mechanical brakes while calibrating the electric mechanical brakes in the preset order;
    calibrating a first electric mechanical brake in which thermal expansion has been detected and then calibrating a second electric mechanical brake placed on an opposite side of a first axle from the first electric mechanical brake using a same calibration value when it is determined that thermal expansion has been detected in any one of the electric mechanical brakes; and
    calibrating air gaps of the electric mechanical brakes placed on a second axle of the vehicle.

6. An electric mechanical brake system, comprising:
    a sensor unit including a wheel speed sensor configured to measure a speed of a wheel of a vehicle, a current sensor configured to detect a current generated during braking of the vehicle, and a pedal sensor configured to detect a pressure applied to a pedal of the vehicle;
    a control unit including a comparison unit configured to compare the speed measured by the sensor unit with a reference value, a determination unit configured to determine whether to calibrate an air gap of an electric mechanical brake disposed on the wheel of the vehicle based on a result of the comparison by the comparison unit, and a calibration unit configured to calibrate the air gap of the electric mechanical brake based on a result of the determination by the determination unit; and
    a driving unit including front wheel electric mechanical brakes having a left front wheel electric mechanical brake and a right front wheel electric mechanical brake and rear wheel electric mechanical brakes having a left rear wheel electric mechanical brake and a right rear wheel electric mechanical brake,
    wherein the calibration unit is configured to determine an order for calibrating the left front wheel electric mechanical brake, the right front wheel electric mechanical brake, the left rear wheel electric mechanical brake, and the right rear wheel electric mechanical brake and to calibrate air gaps of the from wheel electric mechanical brakes and the rear wheel electric mechanical brakes in the determined order.

7. The electric mechanical brake system of claim 6, wherein the control unit is configured to determine whether the vehicle is running or stopped and to calibrate the air gaps of the front wheel electric mechanical brakes and the rear wheel electric mechanical brakes based on a result of the determination.

8. An electric mechanical brake system, comprising:
    a sensor unit including a wheel speed sensor configured to measure a speed of a wheel of a vehicle, a current sensor configured to detect a current generated during braking of the vehicle, and a pedal sensor configured to detect a pressure applied to a pedal of the vehicle;
    a control unit including a comparison unit configured to compare the speed measured by the sensor unit with a reference value, a determination unit configured to determine whether to calibrate an air gap of an electric mechanical brake disposed on the wheel of the vehicle based on a result of the comparison by the comparison unit, and a calibration unit configured to calibrate the air gap of the electric mechanical brake based on a result of the determination by the determination unit; and a driving unit including front wheel electric mechanical brakes having a left front wheel electric mechanical brake and a right front wheel electric mechanical brake and rear wheel electric mechanical brakes having a left rear wheel electric mechanical brake and a right rear wheel electric mechanical brake, wherein the control unit is configured to determine whether the vehicle is running or stopped and to calibrate the air gaps of the front wheel electric mechanical brakes and the rear wheel electric mechanical brakes based on a result of the determination, and wherein, when an increase in the current indicative of thermal expansion is detected in any one of the front wheel electric mechanical brakes and the rear wheel electric mechanical brakes while the vehicle is running, the control unit is configured to calibrate an air gap of an electric mechanical brake in which the increase in the current has been detected and an air gap of an electric mechanical brake disposed on a same axle as the electric mechanical brake in which the increase in the current has been detected.

9. The electric mechanical brake system of claim 8, wherein, when the increase in current indicative of thermal expansion is detected in the front wheel electric mechanical brakes and in the rear wheel electric mechanical brakes while the vehicle is running, the control unit is configured to calibrate an air gap of a first electric mechanical brake in which the increase in current has been detected and an air gap of a second electric mechanical brake disposed on an axle other than an axle on which the first electric mechanical brake is disposed diagonally from the first electric mechanical brake.

* * * * *